(No Model.)

J. H. HITTLE & A. D. DAVIS.
COMBINED HAY AND STOCK RACK.

No. 313,333. Patented Mar. 3, 1885.

WITNESSES:
F. McArdle
C. Sedgwick

INVENTOR:
J. H. Hittle
A. D. Davis
BY Munn & Co
ATTORNEYS.

UNITED STATES PATENT OFFICE.

JONAS H. HITTLE AND AURIN D. DAVIS, OF MACKINAW, ILLINOIS.

COMBINED HAY AND STOCK RACK.

SPECIFICATION forming part of Letters Patent No. 313,333, dated March 3, 1885.

Application filed December 15, 1884. (No model.)

*To all whom it may concern:*

Be it known that we, JONAS H. HITTLE and AURIN D. DAVIS, of Mackinaw, in the county of Tazewell and State of Illinois, have invented a new and Improved Combined Hay and Animal Rack, of which the following is a full, clear, and exact description.

Our improvements relate to racks adapted to be used on wagons for carrying hay, and also for penning hogs or other animals. Such a rack is shown in the Letters Patent granted to us October 21, 1884, No. 306,923; and the present invention consists in certain features of construction which render the rack more convenient and reliable in use, as hereinafter described and claimed.

Reference is to be had to the accompanying drawings, forming a part of this specification, in which similar letters of reference indicate corresponding parts in all the figures.

Figure 1:
Figure 2:
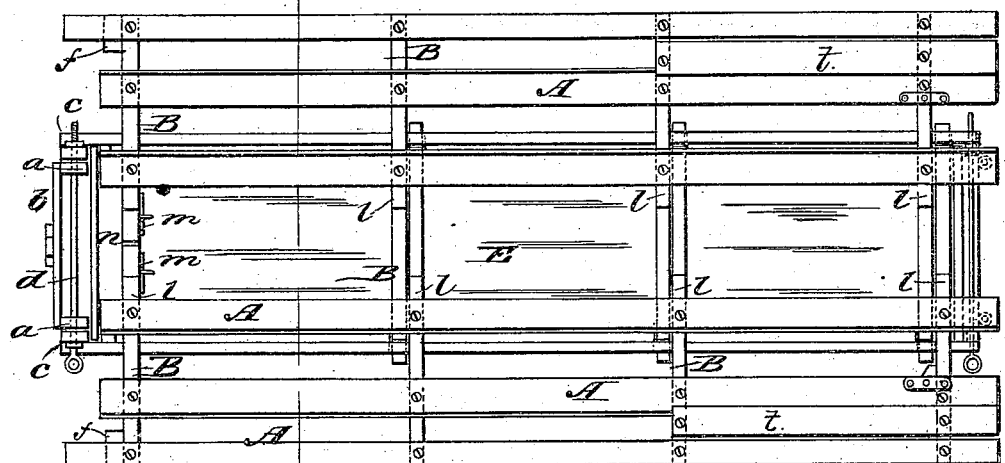
Figure 3:
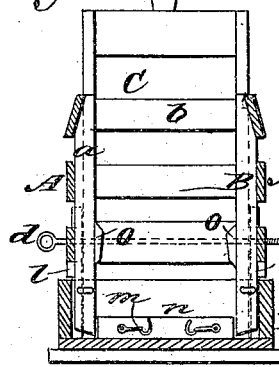
Figure 4:
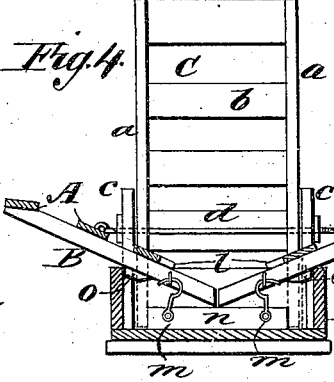
Figure 5:
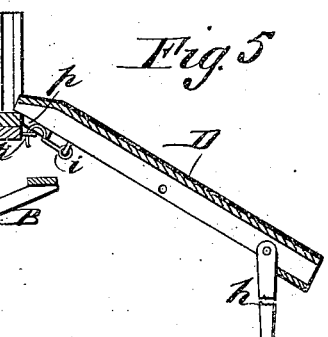

Figure 1 is a longitudinal section of a wagon-box with the rack arranged vertically for penning animals. Fig. 2 is a plan view showing the arrangement as a hay-rack. Fig. 3 is a cross-section on line $x$ $x$ of Fig. 1. Fig. 4 is a cross-section on line $y$ $y$ of Fig. 2, and Fig. 5 is a partial section showing the end-gate arranged as a bridge.

E is the box of an ordinary wagon. The two side racks are formed alike of longitudinal strips A, attached to the cross-strips B, that extend below the lower strip A, for use as stakes when the racks are set upright, in which case the ends of strips B extend through holes in the wagon-bottom, as shown in Fig. 1. We prefer, however, that the front strips B rest on the bottom, as their projection below would interfere in turning the wagon. The front end-gate, C, formed by standards $a$ and cross-bars $b$, is attached to short posts $c$ by a cross-rod, $d$, passing through slots $e$ in the lower ends of the gate-standards $a$, and in the upright position of the racks the gate C bears on blocks $f$, fixed on the top strip A, to which blocks the gate is also attached by hooks $g$. The object of slots $e$ is to allow of the gate being pushed inward when laid down and not in use, so it shall not interfere by projection in front. The rear end-gate, D, is boarded tightly, and is provided with folding legs $h$ near its lower end and hooks $i$ near its upper end. In the vertical position this gate is held in place by catching the hooks $i$ into eyes on the side racks. By placing this gate in an inclined position at the rear of the wagon-box, with the hooks $i$ caught in the eyes $k$ and its outer end supported by legs $h$, it then forms a bridge for letting the animals pass out of the wagon. Cleats $p$ on the gate prevent it from slipping upward. At $l$ on the strips or stakes B of the racks are blocks that take on the side-boards of the wagon-box, so as to give a space between the lower rails and box.

The racks when applied in the inclined position shown in Figs. 2 and 4 are adapted for carrying hay. The cross-strips B in this case rest on the sides of the box, and the shorter ones are held by hooks $m$, that are hung on a block, $n$, attached on the wagon-bottom at the front.

To prevent spreading, cleats $o$ are attached to the two shorter strips B and take against the sides of the box E. At $t$ on the racks are short boxes for covering the wagon-wheels. These improvements render the racks convenient and useful in every respect.

Having thus described our invention, we claim as new and desire to secure by Letters Patent—

1. The combination, with a wagon-box provided with side racks, of the front end-gate, C, provided with slots $e$ and hung upon the sides of the box by cross-rod $d$, substantially as specified.

2. The combination, with a wagon-body and side racks, of the rear end-gate, D, provided with hooks and legs $h$, whereby it is adapted for use as a bridge, substantially as described.

3. The combination, with a wagon-body and side racks, of the block $n$ and hooks $m$, for connection to the front strips of the racks, as specified.

4. In a combined hay and animal rack, the cleats $l$, combined with the strips B of the racks, as and for the purpose specified.

JONAS H. HITTLE.
AURIN D. DAVIS.

Witnesses:
A. B. DAVIS,
DICK WILSON.